[11] 3,601,696

| | | |
|---|---|---|
| [72] | Inventors | Joseph L. Chovan<br>Liverpool;<br>Earl R. Wingrove, Jr., North Syracuse,<br>both of, N.Y. |
| [21] | Appl. No. | 860,345 |
| [22] | Filed | Sept. 23, 1969 |
| [45] | Patented | Aug. 24, 1971 |
| [73] | Assignee | The United States of America as<br>represented by the Secretary of the Army |

[54] SPECTRUM ANALYZER UTILIZING RELATIVE PHASE SLOPE DIFFERENCE OF PAIRS OF LINES IN SPECTRUM TO MEASURE RELATIVE PHASES OF INDIVIDUAL LINES
10 Claims, 3 Drawing Figs.

[52] U.S. Cl. .................................................. 324/77 R
[51] Int. Cl. ................................................ G01n 23/16

[50] Field of Search ........................................... 324/77, 82, 57

[56] References Cited
UNITED STATES PATENTS
2,580,803   1/1952   Logan ........................... 324/57 X

*Primary Examiner*—Edward E. Kubasiewicz
*Attorneys*—Alva H. Bandy, William G. Gapcynski, Lawrence A. Neureither, Leonard Flank, William P. Murphy and Robert C. Sims ABSTRACT: The relative amplitudes and phases of individual lines of a wide band line spectrum are determined by dividing the spectrum analyzer into two parallel branches. One branch process a fixed reference pair of lines in the spectrum and the other branch processes an arbitrary tunable line pair. This allows the instantaneous relative phase slop difference of two pairs of lines in the spectrum to be measured.

Joseph L. Chovan
Earl R. Wingrove, Jr.
INVENTORS.

SPECTRUM ANALYZER UTILIZING RELATIVE PHASE SLOPE DIFFERENCE OF PAIRS OF LINES IN SPECTRUM TO MEASURE RELATIVE PHASES OF INDIVIDUAL LINES

BACKGROUND OF THE INVENTION

This invention is related to the field of testing. Specifically, the testing of the individual lines of a wide bank line spectrum. A plot of the instantaneous phase angles (choosing some arbitrary time as a reference) will follow an arbitrary distribution at any instant, and will change with time. However, exactly the same phase distribution will be repeated at a later time, since the pulse will be repeated. Therefore, if measurements were taken at this instant in time of each pulse, then an accurate plot of the relative phase distribution could be determined by conventional devices by taking measurements over a time interval of a multitude of pulses. However, if a slight drift occurs between the necessary synchronizing reference signal and the actual time desired, there will be a corresponding change for each frequency in the spectrum to be measured. Measurement of relative phase angles in a spectrum by this method imposes severe synchronization requirements. The present invention measures the relative slope of the phase distribution curve without the need of precise synchronization.

SUMMARY OF THE INVENTION

The line spectrum to be analyzed can be produced by modulating an $x$-band signal with a continuous video pulse train. A plot of the instantaneous phase angles may follow any arbitrary distribution. Further, the instantaneous angles between all of these phasers which rotate at different frequencies will change as time goes on. However, if one chooses any two pairs of lines in the instantaneous phase distribution having a frequency difference of $\Delta w$, some phase difference $\Delta \Phi m$ exists for one pair at a particular instant. At the same instant another phase difference $\Delta \Phi n$ exists for the other pair. The instantaneous relative phase slope difference of the two pairs would be: $(\Delta \Phi m/\Delta w)-(\Delta \Phi n/\Delta w)$. It can be seen that the slope difference is independent of time. That is, at any arbitrary time ($t$) later, each phase slope has changed by an amount $wt$. Consequently, $\Delta \Phi m$ will change by the same amount as $\Delta \Phi n$; that being $(\Delta w)t$. This means that the difference in relative phase slope is constant with time. Therefore, there are no synchronization problems if relative phase slope is measured instead of measuring relative phase angle directly.

The circuit for carrying out the measurements is divided into two parallel branches. One branch processes the fixed reference pair of lines in the spectrum and the other branch processes the arbitrarily tunable line pair. In each branch a local oscillator is locked at a reference frequency of 3 MHz. below the lower line in the pairs of lines of interest. Of course other reference frequencies could be used. The signal spectrum is mixed with this local oscillator in a first $x$-band mixer. Narrow band-pass filters are provided at the output to obtain signals at 3 MHz. and 3 MHz. $+ \Delta w$. An additional filter may be provided at 3 MHz. $+ 3 \Delta w$ to provide similar phase slope information between lines separated by 3 $\Delta w$. This information is very useful when the in between lines are at a null in the spectrum. The output of the 3 MHz. filter is mixed with the output of the 3 MHz. $+ \Delta w$ to obtain a difference frequency $\Delta w$ out of a second mixer. Since similar signals are available from the fixed reference branch and the tunable branch, the phase difference between these two signals can be measured to obtain the slope difference. The relative amplitudes of the various spectral lines are measured by an RF voltmeter at the output of the narrow band filters which follow the first mixer.

The fixed and the swept local oscillators are locked to a fixed offset from one of the spectral lines during a reading. The phase lock synchronizer supplies the necessary control voltage to the helix of a backward wave oscillator and to the reflector of the klystron to lock the frequency of these oscillators. An indication of when the oscillators are locked on to the chosen spectrum lines is given by the synchronizer so as to indicate when measurements can be taken. The synchronizer for the swept oscillator must also be able to combine its correction voltage with some variable scan voltage so that the oscillator may lock to different spectral lines. A slowly rising ramp or a stepped voltage for the variable scan voltage would be best for automatic measuring and recording. A fixed voltage from a potentiometer setting may be used for manual operation.

The measurements to be taken and recorded are the spectral line to which the oscillator is locked. This is indicated by the DC voltage on the helix of the backward wave oscillator. The amplitude of the sideband is indicated by the RF voltmeter's DC output. The difference in phase slope for adjacent spectral lines is, of course, measured. The difference in phase slope for spectral lines separated by two in-between lines may also be measured. For manual operation, the sequencing switches can be turned by hand and data manually recorded. For automatic operation, a sequencing switch is necessary to feed the data to a digital recorder. Such a switch may either be a mechanically driven rotary switch or its equivalent in digital logic circuits. Such a sequencing switch must be synchronized in the phase lock synchronizer so that it operates only while the oscillator is locked to a desired frequency.

DESCRIPTION OF THE PREFERRED EMBODIMENT

Figure 1:
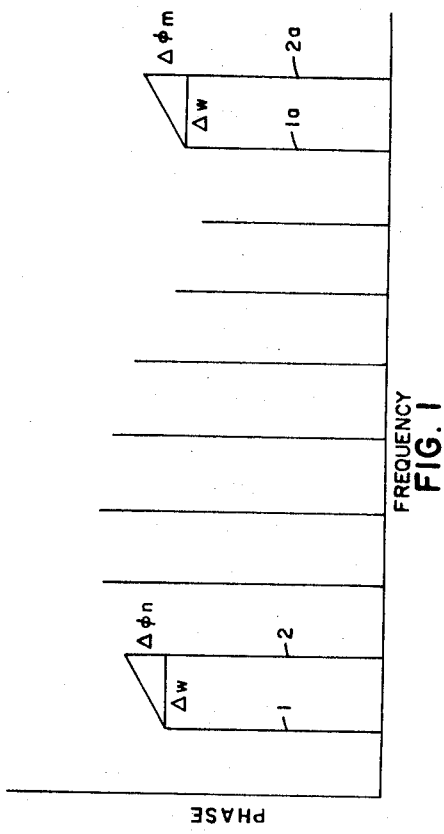
FIG. 1 is a plot of the instantaneous phase angles of a line spectrum produced by modulating an $x$-band signal with a continuous video pulse train.

This description is directed to a preferred embodiment for measuring the relative amplitudes and phases of the individual lines of a wide-band line spectrum having a line spacing of 11.5 MHz. centered at an $x$-band frequency. It will be obvious that the technique could be employed at other spacings and other frequency bands by appropriated design modification. A line spectrum produced by modulating an $x$-band signal with a continuous video pulse train will present a plot of instantaneous phase angles of each of the different frequency sine waves such as that shown in FIG. 1 at some arbitrary chosen time as a reference. In general, a plot of such instantaneous phase angles will follow an arbitrary distribution. The instantaneous angles between all of these phasers (lines) which rotate at different frequencies will change as times goes on. Thus the plot shown in FIG. 1 will change with time. However, if two pairs of lines 1 and 2 and 1$a$ and 2$a$ are studied at the instant of time the graph was made, it will be seen that some phase difference $\Delta \Phi m$ exists for pair 1$a$ and 2$a$. A different phase difference $\Delta \Phi n$ exists for pair 1 and 2. From this it can be seen that there exists an instantaneous slope difference between the two pairs: $(\Delta \Phi m /\Delta w)-(\Delta \Phi n/\Delta w)$. The change in slope of each pair of lines is dependent on time; however, the change in the relative phase slope difference between the two pairs is independent of time and, therefore, will not change. Therefore it can be seen that the measurement of slope difference of the two pairs of lines can be made over a long period of time and does not have to be made instantaneously.

Figure 2:
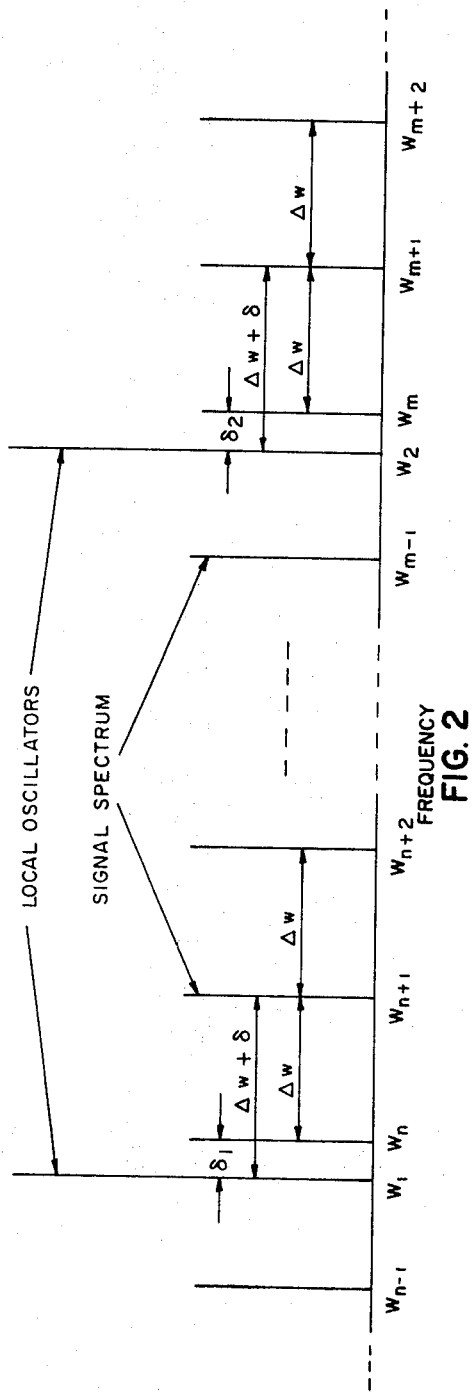
FIG. 2 shows the spacing of the lines of the spectrum with the addition of the relative frequency placement of the local oscillators.
Figure 3:
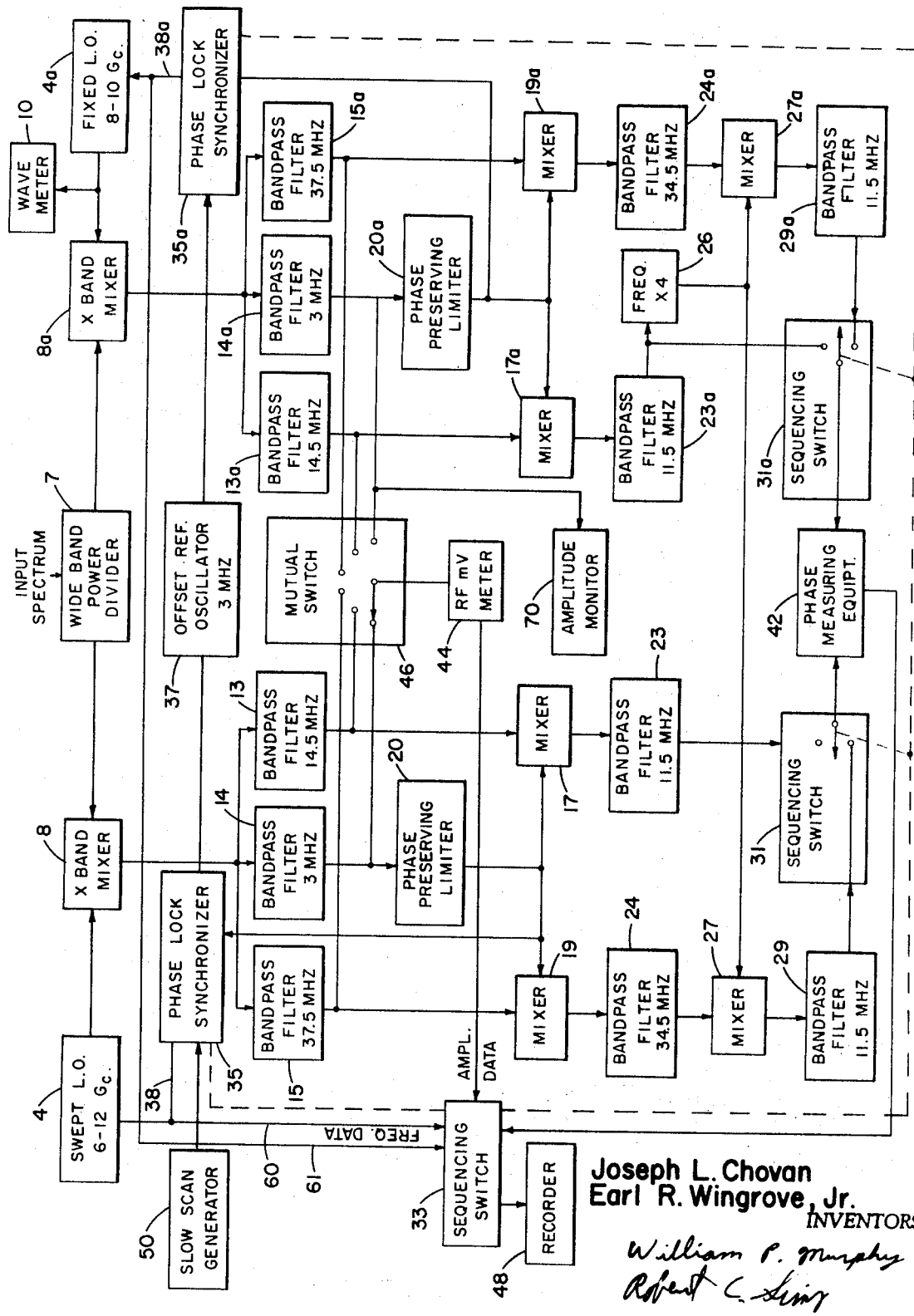
FIG. 3 is a block diagram illustrating a preferred embodiment of the present invention.

FIG. 2 shows that the spacing of the lines of the spectrum are all at a frequency of $\Delta w$. In the example used in the description of the preferred embodiment $\Delta w$ is 11.5 MHz.; however, obviously, other spectrums having different spacings could be measured by the present invention with appropriate design changes. FIG. 3 shows that the complex spectrum analyzer is divided into two parallel branches: one for processing the fixed reference pair of lines at W$m$ and W$m$+1 and the other for processing an arbitrarily tunable line pair at $Wn$ and $Wn+1$. In each branch a local oscillator 4 or 4a is locked at a frequency δ (3 MHz.) below the lower line of the selected pair of lines. The signal spectrum is fed to a wide band power divider 7 which splits the input spectrum and sends it to the inputs of x-band mixers 8 and 8a. A wave meter 10 is connected to measure the output of oscillator 4a. Mixers 8 and 8a mix the signal spectrum with the local oscillators and send the result to band-pass filters 13, 14, 15, 13a, 14a, and 15a. Band-pass filters 13, 14, 13a, and 14a have their outputs fed to mixers 17 and 17a. Filters 13 and 13a are designed to pass 14.5 MHz. which is $δ + Δ w$, and filters 14 and 14a are designed to pass 3 MHz. which is δ. Band-pass filters 15 and 15a are also provided to pass $δ + 3 Δ w$ (37.5 MHz.); which frequency along with the outputs from filters 14 and 14a is fed to mixers 19 and 19a. This will provide phase slope information between lines separated by 3 times the line spacing of the spectrum. Such information is useful when the in-between lines are at a null in the spectrum. It should be noted that the phase angle of each local oscillator is added to the phase angle of each spectral line present at the output of the filters. Phase preserving limiters 20 and 20 a are connected between the output of filters 14 and 14a so as to insure proper operation of mixers 17, 17a, 19, and 19a even though the amplitudes of the individual lines of the input spectrum fluctuate. Limiters 20 and 20a are limiting i-f amplifiers which are characterized by a constant output power level independent of the input power level. The phase of the output signal bears a fixed relationship to the phase of the input signal regardless of the input power level. Thus, except for a known, fixed phase shift, the signal phase is unchanged by passage through the phase preserving limiters 20 and 20a. One possible circuit for limiter 20 would be a center-taped transformer having its input on the primary winding and its full secondary winding connected across two input terminals of a full wave bridge rectifier by way of a capacitor. A DC bias source is connected across the other terminals of the rectifier. The output of the limiter is taken across the center tap and the common line between the capacitor and the rectifier.

Mixers 17, 17a, 19, and 19a do the mixing and feed the results to band-pass filters 23, 24, 23a, and 24a. MHz). A frequency multiplier (× 4) 26, mixers 27 and 27a, and band-pass filters 29 and 29a are connected to filters 24 and 24a so as to provide a final output frequency of $δ w$ (11.5 MHz). It should be noted that in taking (passing) the difference frequency from mixers 17, 17a, 19, and 19a, the phase of the original local oscillator (which was added to the phase of each line) drops out. The resulting phase angle which is added to sequencing switch 31 or 31a is the difference between the phase angles of the two selected spectral lines which were mixed with the local oscillators. This is shown as $δ Φm$ and $δ Φn$ in FIG. 1. Sequencing switches 31, 31a, and 33 are controlled manually or automatically. In automatic operation the switches may be mechanically driven, or digital logic circuits may be used. The switches must be synchronized to the phase lock synchronizers 35 and 35a so that they operate only while the oscillator is locked to a desired frequency. The phase lock synchronizers 35 and 35a are provided to lock the local oscillators 3 MHz. away from the selected spectral line. Any of the known synchronizers could be used such as the Dynec DY-2650A which is described on pages 176 and 192 of Hewlett Packard Catalog No. 25, 4-65. Synchronizers 35 and 35a phase compare harmonics of the 3 MHz. signal out of phase preserving limiters 20 and 20 a with the harmonics of the 3 MHz. offset reference oscillator 37 to generate error signal outputs at 38 and 38a. These error signal outputs are fed to the local oscillators (to the klystron of the local oscillator for example) to control the frequency output. In this manner the local oscillators 4 and 4a are phase locked 3 MHz. away from the lower spectral line of the selected pairs of lines. Offset reference oscillator 37 may be any of the well-known stable oscillators such as a crystal oscillator.

It can now be seen that the outputs of each of the sequencing switches 31 and 31a is a 11.5 MHz. frequency which varies its phase in accordance to the difference in phases of the two selected lines. The output of sequencing switch 31 has an output ($Δ Φn/Δ w$), while the output of sequencing switch 31a has an output ($Δ Φm/Δ w$). These outputs are obtained when the switch is in the down position as referenced to FIG. 3. In the up position, the phase differences will be between the 1 and 1a lines of FIG. 1 and the lines three positions further in frequency from line 1 and line 1a. Since the frequency output in either case will be 11.5 MHz., due to the connections of multiplier 26 and mixers 27 and 27a, it will not make any difference to the phase measuring equipment 42. Phase measuring equipment 42 has its inputs connected to the outputs of sequencing switches 31 and 31a so as to measure the phase difference between these two outputs. The output of phase measuring equipment 42 will be the desired relative slope difference of the two pairs of lines ($Φm/w$)—($Φn/w$). This measurement is sent to sequencing switch 33. Phase measuring equipment 42 may take the shape of any of the known phase measuring systems such as the one described in the IEEE Transactions on Instrumentation and Measurement, Volume IM-15, Number 4, Dec. 1966, pages 304–310, or that described in General Electric TIS no. R66EMH21, May 12, 1966.

The relative amplitudes of the various spectral lines are measured by an RF voltmeter 44 by way of a manual switch 46. Switch 46 has terminals connected to the outputs of each of the band-pass filters 13-15 and 13a-15a. The measurements from RF meter 44 are sent to sequencing switch 33. A recorder 48, such as a digital recorder, is connected to the output of sequencing switch 33 so as to record the various measurements taken. In order that different pairs of spectral lines may be compared, a slow scan generator 50 is connected to phase lock synchronizer 35. The slow scan generator tunes the swept oscillator 4 from one spectral line to the next. In this way the corrective voltage from synchronizer 35 is combined with the scan voltage of generator 50 enabling the local oscillator to lock to different spectral lines. The scan voltage from generator 50 will be a slowly rising ramp or a stepped voltage for automatic measuring and recording. The tuning rate is slow enough to permit all the desired measurements to be made at each spectral line. In manual operation, the output of generator 50 may be a fixed voltage from an adjustable potentiometer. The adjustment of the potentiometer is changed to select different spectral lines.

In operation recorder 48 will record the spectral lines to which the oscillators are locked. This frequency data is fed to recorder 48 by lines 60 and 61 which are connected to oscillators 4 and 4a. Lines 60 and 61 could be connected to sense the DC voltage on the helix of the backward wave oscillator of oscillators 4 and 4a. This DC voltage would be a measurement of the frequencies of the oscillators and, therefore, an indication of the spectral lines to which the oscillators are locked. Amplitudes of the sidebands are indicated by the RF voltmeter's DC outputs. An amplitude monitor 70 can be provided for the view of the operator. The difference in phase slope of the selected pairs of spectral lines is obtained from phase measuring equipment 42. Manual switch 46 could be made automatic and synchronized with sequencing switch 33 and recorder 48 so as to automatically record the amplitude data.

While the invention has been described with reference to a preferred embodiment thereof, it will be apparent that various modifications and other embodiments thereof will occur to those skilled in the art within the scope of the invention. Accordingly, it is desired that the scope of the invention be limited only by the appended claims.

We Claim:

1. A method of analyzing a spectrum having individual lines comprising the steps of generating first and second known frequencies; separately mixing the spectrum with said first and second known frequencies; bandpassing each mixed result so as to obtain a first signal which is equal in frequency to the frequency of a first line of the spectrum minus the frequency of the first known frequency, a second signal which is equal in frequency to the frequency of the first signal plus the frequency of a second line of the spectrum, a third signal which is equal in frequency to the frequency of a third line of the spectrum minus the frequency of the second known frequency, and a fourth signal which is equal in frequency to the frequency of said third signal plus the frequency of a fourth line of the spectrum; mixing said first and second signals and bandpassing the mixed result so as to obtain a fifth signal which is the difference between said first and second lines of said spectrum; mixing said third and said fourth signals and bandpassing the mixed result so as to obtain a sixth signal which is the difference between said third and fourth lines of the spectrum; and measuring the phase difference between said fifth and sixth signals.

2. A method as set forth in claim 1 wherein said first known frequency is selectively varied so that the first signal will be equal in frequency to the frequency of a selected line of the spectrum minus the first known frequency; and the second signal will be equal in frequency to the frequency of the first signal plus the frequency of another line of the spectrum.

3. A method as set forth in claim 2 wherein said spectrum has its lines spaced apart from each other by a third known frequency; wherein said fifth signal, sixth signal, and third known frequency are equal to each other in frequency; said first and second lines are adjacent to each other in the spectrum; and said third and fourth lines are adjacent to each other in the spectrum.

4. A method as set forth in claim 3; further comprising the steps of containing seventh and eighth signals by bandpassing the mixed spectrum and the first and second known frequencies; said seventh signal being equal in frequency to the frequency of the first signal plus the frequency of a fifth line of the spectrum; said eighth signal being equal in frequency to the frequency of the third signal plus the frequency of a sixth line of the spectrum; mixing said first signal and said seventh signals and bandpassing the result so as to obtain a tenth signal which is the difference between said first and fifth lines of the spectrum; mixing said third signal and said ninth signal and bandpassing the results so as to obtain an eleventh signal which is the difference between said third line and said sixth line of said spectrum; generating a fourth known frequency; mixing the tenth signal with said fourth known frequency and bandpassing the result so as to obtain a twelfth signal which is equal in frequency to said third known frequency; mixing said eleventh signal with said fourth known frequency and bandpassing the result so as to obtain a thirteenth signal which is equal in frequency to the frequency of the third known frequency; selectively mixing either the second signal or the twelfth signal with the first signal and bandpassing the result so as to obtain the fifth signal; and selectively mixing either the fourth signal or the thirteenth signal with the first so as to obtain the sixth signal.

5. In a system for analyzing a spectrum having a plurality of individual lines each spaced a constant known frequency apart, the improvement comprising means for generating first and second selected frequencies: first and second sections; each section containing a first mixer having first and second inputs with the first inputs being spectrum signals; the second input of the mixer of the first and second sections being respectively connected to receive the first and second selected frequencies; each section containing at least first and second band-pass filters having inputs connected to outputs of said first mixer; each section including a second mixer having inputs connected to outputs of the respective first and second band-pass filters; third band-pass filters respectively connected to the outputs of the second mixers; phase measuring means; and the output of the third band-pass filter of each section being connected to said phase measuring means.

6. A system as set forth in claim 5 further comprising fourth band-pass filters respectively connected to the outputs of the first mixer; third mixer having inputs connected to the outputs of the first band-pass filter and the fourth band-pass filter; fifth band-pass filters respectively connected to the outputs of the third mixers; a generator connected to one of the third band-pass filters to generate a third selected frequency; each section having a fourth mixer which has inputs connected to the generator and the output of the fifth band-pass filter; sixth band-pass filters respectively connected to the outputs of the fourth mixers; switching means connected to the outputs of the third and sixth band-pass filters in each section; and said switching means selectively connecting either the output of the third or sixth band-pass filter to the phase measuring means.

7. A system as set forth in claim 6 further comprising a further measuring means connected to the outputs of the first, second, and fourth band-pass filters of each section.

8. A system as set forth in claims 7, wherein one of said sections is disposed for generating different frequencies.

9. In a system for analyzing a spectrum having a plurality of individual lines each spaced a constant known frequency apart, the improvement comprising means for generating first and second selected frequencies; first and second sections; each section containing a first mixer having an output and first and second inputs with the first inputs being adapted to receive spectrum signals; the second input of the mixer of the first and second sections being respectively connected to receive the first and second selected frequencies; each section containing at least first and second band-pass filters with inputs of the first and second band-pass filters respectively connected to the outputs of the first mixers, each section including a second mixer having inputs connected to outputs of the respective first and second band-pass filters; third band-pass filters respectively connected to outputs of the second mixers; phase measuring means and the third band-pass filter of each section having an output connected to said phase measuring means.

10. A system as set forth in claim 9 further comprising fourth band-pass filters respectively connected to the outputs of the first mixers; third mixers having inputs respectively connected to the outputs of the first band-pass filters and the fourth band-pass filters; fifth band-pass filters respectively connected to outputs of the third mixers; a generator connected to one of the third band-pass filters to generate a third selected frequency; each section having a fourth mixer which has inputs connected to the generator and an output of the respective fifth band-pass filter; sixth band-pass filters respectively connected to outputs of the fourth mixers; switching means connected to the outputs of the third and sixth band-pass filters in each section; and said switching means selectively connecting either the output of the third or sixth band-pass filter in each section to the phase measuring means.